United States Patent
Larochelle et al.

(10) Patent No.: US 6,526,468 B1
(45) Date of Patent: Feb. 25, 2003

(54) PERIPHERAL BUS EXTENDER

(75) Inventors: François Larochelle, Prévost (CA); Yves Méthot, Prévost (CA)

(73) Assignee: Robotel Electronique Inc., Laval (CA)

( * ) Notice: Subject to any disclaimer, the term of this patent is extended or adjusted under 35 U.S.C. 154(b) by 0 days.

(21) Appl. No.: 09/461,045

(22) Filed: Dec. 15, 1999

(51) Int. Cl.[7] .............................................. G06F 13/00
(52) U.S. Cl. ...................................... 710/305; 710/100
(58) Field of Search ................................ 710/305, 306, 710/300, 313, 314, 100; 709/245, 250; 326/21, 30, 86

(56) References Cited

U.S. PATENT DOCUMENTS 5,822,330 A    10/1998    Buckland
6,308,215 B1 *  10/2001   Kolb et al. .................. 709/233

FOREIGN PATENT DOCUMENTS

| EP | 0 395 416 A2 | 10/1990 | ............ G06F/13/38 |
| WO | WO 84/04185 | 10/1984 | ............ G06F/3/00 |
| WO | WO 00/49507 | 8/2000 | ............ G06F/13/38 |
| WO | WO 00/67103 | 11/2000 | ............ G06F/3/00 |

* cited by examiner

Primary Examiner—Xuan M. Thai
(74) Attorney, Agent, or Firm—Marks & Clerk

(57) ABSTRACT

An arrangement for extending the range of a peripheral bus carrying message packets has a pair of extenders interconnected by a balanced transmission line for transferring signals directly between the peripheral buses without tracking the message packets. Typically, the peripheral buses are USB buses.

12 Claims, 3 Drawing Sheets

PERIPHERAL BUS EXTENDER

FIELD OF THE INVENTION

This invention relates to a device for extending the range of peripheral bus, for example, a Universal Serial™ (USB) Bus.

BACKGROUND OF THE INVENTION

There is a need in the computer field to connect peripheral devices, such as keyboards, mice, cameras, printers, scanners, telephony systems, communications circuits, etc., to a host computer. The Universal Serial Bus (USB) was developed as a standardized, miniature, inexpensive interface for this purpose.

The USB comprises four wires. This gives four lines dedicated as follows:

$V_{bus}$ (power), GND (ground), D+ (data) and D− (data). The power and ground lines provide power from the host to the USB peripheral devices. The two data lines support bi-directional communications (half duplex) between the host computer and the USB peripheral device. Data is transferred in a bi-directional fashion in message packets.

The data lines are not fully balanced, and their performance is consistent with single-ended, unterminated lines. The maximum practical connection distance, dictated by the speed of the data communications, is limited to 5 meters. The data lines are tied to ground or power ($V_{bus}$) via pull up or pull down resistors at the host or USB peripheral device. At the host side, each of the two lines has the pull down resistor. At the USB peripheral device side, one of the two data lines has a pull up resistor depending on the speed characteristics of the device.

USB specifications are identified through two classes of device: full speed (for cameras and scanners), and low speed (for keyboards and mice). Low speed devices include a pull up resistor for the D− line. Full speed devices include a pull up resistor for the D+ line.

The USB standard supports a hub function. Hubs can be used to extend connection distances and/or connect several devices to a single host USB port. However, hubs inherently are asymmetric devices designed to be attached on one side to a host and on the other side to one or more peripheral devices. To the peripheral devices, the hub appears electrically as a host. They serve primarily to expand the number of USB ports and not extend the range of the peripheral bus over long distances.

An object of the invention is to provide a simple method of extending the range of a peripheral bus, such as a USB.

SUMMARY OF THE INVENTION

According to the present invention there is provided an arrangement for extending the range of a peripheral bus carrying message packets on at least one signal line, comprising a first extender device for connection to a first peripheral bus port, said first extender device serving as repeater for transferring signals to and from said first peripheral bus; a second extender device for connection to a second peripheral bus port, said second extender device serving as repeater for transferring signals to and from said second peripheral bus port; and a transmission medium for each said signal line on said peripheral bus interconnecting said first and second extender devices, whereby signals are directly transferred between the first and second peripheral bus ports over said transmission media without tracking the message packets.

In accordance with the principles of the invention, the signals on the bus are detected and directly transferred over a transmission medium to a like device which repeats them onto a similar bus. The extender devices do not attempt to read the message carried on the bus, but merely serve as repeaters transferring signals between the two extender devices.

The transmission medium is typically a transmission line, preferably a balanced transmission line, although it is possible that an unbalanced line can be used. The transmission line may be twisted pair, although other types of transmission line, such as optic fibres can be used. More generally, it is envisaged that RF and infrared transmission media can also be used.

Typically the terminal devices, known as bus extenders, detect the rising and trailing edges of the incoming signals.

The peripheral bus is typically a USB bus. In the specification, a USB bus includes a USB host or peripheral device. In other words, it will be understood that the extender can be connected directly to the peripheral device or host with USB support.

In a further aspect the invention provides a method of extending the range of a peripheral bus having a plurality of signal lines carrying message packets, comprising the steps of receiving incoming signals on said signal lines, and transmitting said signals on respective transmission media to a remote receiver without tracking said message packets.

BRIEF DESCRIPTION OF THE DRAWINGS

The invention will now be described in more detail, by way of example only, with reference to the accompanying drawings, in which.

DETAILED DESCRIPTION OF THE INVENTION

As discussed above, the USB format has two data lines, which therefore permit up to four possible different states for communications as follows:

State

| D+ | D− |
|---|---|
| 0 | 0 |
| 0 | 1 |
| 1 | 0 |
| 1 | 1 |

The state in which both D+ and D− are at logic high (1) is not permitted under the USB specification, so only three valid states are possible.

The idle state (or floating state) of the bus when connecting a host to a low-speed USB peripheral device is (0,1). Similarly, the idle state (or floating state) of the bus when connecting to a full-speed USB peripheral device is (1,0).

For a low-speed device, a message is initiated when the D– line is forced to a logic low (1,0). Communications information is delivered in a synchronous fashion following the initial state transition, with the data lines toggling between a (1,0) and (0,1) state according to the bit values within the packet.

For a full-speed device, communications are initiated when the D+ line is forced to a logic low (0,1). Communications information is delivered in a synchronous fashion as message packets following the initial state transition, with the date lines toggling between a (0,1) and (1,0) state according to the bit values within the packet.

The state (0,0) is reserved for an End Of Message indication and/or Keep Alive indication.

When a hub is employed, the hub interprets the message packets received from the USB bus and acts as a host for downstream peripheral devices.

Figure 1:
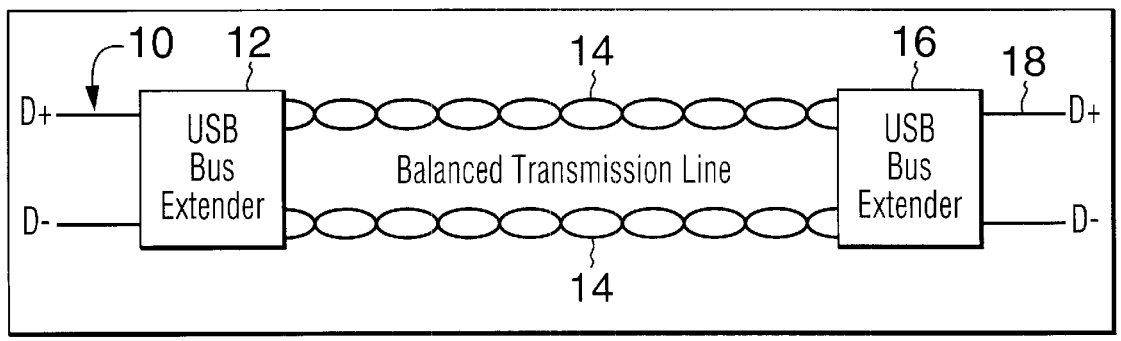
FIG. 1 is a block diagram showing a host connected to a USB peripheral device over an extender in accordance with the principles of the invention.
Figure 2:
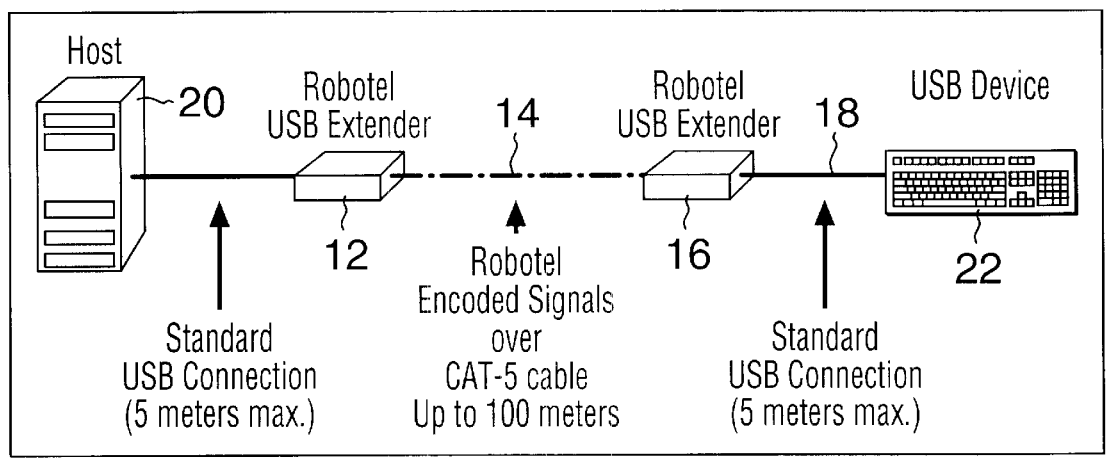
FIG. 2 shows a balanced transmission line between two extender devices.

In the arrangement shown in FIG. 1, in accordance with the principles of the invention, the data lines D+ and D– of a USB bus 10 are connected to an extender device 12, which is connected via a pair of balanced transmission lines 14, which in the exemplary embodiment are shown as a twisted pair, to a similar device 16 at the far end, which is in turn connected to a second USB bus 18. For example, the first bus 10 may be connected to a host 20 and the second bus 18 connected to a peripheral device 22, as shown in FIG. 2. Extender 12, 16 in effect translates standard USB electrical signals into a balanced transmission line format. The translation occurs purely at the physical level, and the translation is entirely transparent to the packet and signaling process used by the USB devices.

An important feature of the extender device is thus that it only examines electrical signal transitions on the USB. It does not require a microprocessor and there is no reading and/or interpretation of message content between USB devices. There is no packet. The circuit relies solely on state changes on the USB data lines to transfer the signals to the far end.

The logic circuit in the extender must perform two primary functions. Firstly, it must detect the edges of all signal transmissions on the USB bus with respect to the known idle of floating state. Second, it must determine which entity, host or device, initiates each signal transmission.

Figure 3:
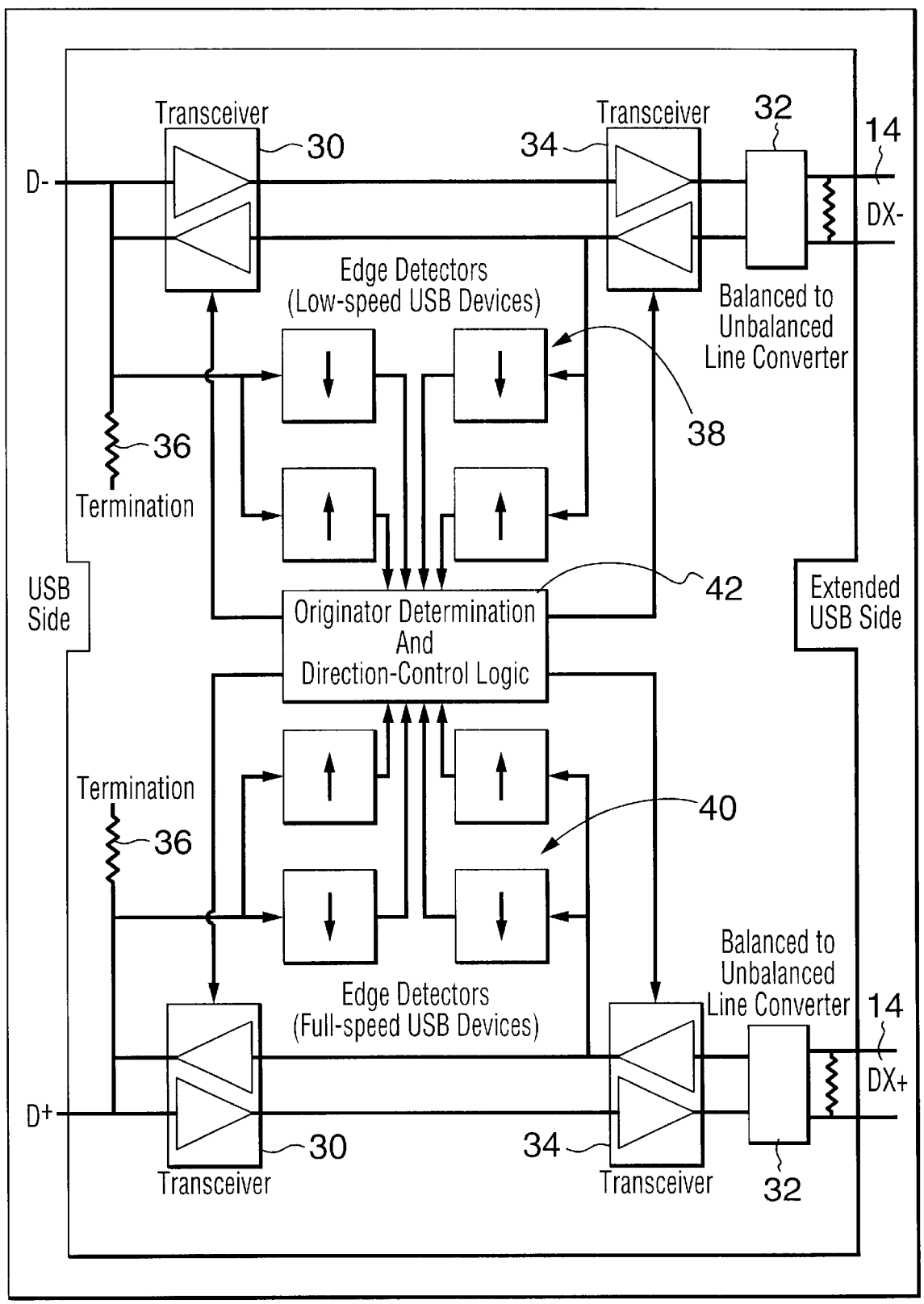
FIG. 3 is a functional block diagram of an extender device.

FIG. 3 shows a block diagram of the extender device.

On the USB side, each data line, D+, D– is connected to a transceiver 30 sending and receiving signals on the signal lines. Similarly, balanced transmission lines are connected through balance circuits 32 to respective transceivers 34 on the transmission line side. The circuits 32 convert from balanced to unbalanced lines in a manner known per se. On the USB side, terminating resistors 36 are provided. These can be tied to D+ (normally +3.3 volts dc) or to ground, or left floating. These terminations are designed to be configured to emulate a low speed peripheral device, a full speed peripheral device, or a host depending on the entity connected.

Because the USB data lines support half-duplex bi-directional communications, either the host or the USB peripheral device can initiate a state change on the data lines.

The transceivers that are used to interface to the outside world connections, (D–, D+, DX– and DX+), are all initially configured such that the USB Extender can monitor each of the four lines.

The described extenders typically allow the length of a USB bus to be increased up to 100 meters.

The received signals from each of the lines are sent to sets of edge detectors. Edge detectors 38 are used for low speed devices, such as keyboards and mice. Edge detectors 40 are used for fill speed devices, such as scanners. Both rising edges and trailing edges are monitored. When a change from the idle state is detected the Originator Determination logic 42 immediately identifies which side, (USB or extended USB), caused the state change. The Direction Control circuitry then enables the transmission mode on the appropriate transceivers so that information appearing on the data lines is passed through the USB Extender from source to destination.

When there is second state change on the data lines, identified by the edge detectors, the Direction Control circuit allows the transceivers to momentarily pass this state change through the USB Extender, but then immediately resets all transceivers to monitor the four data lines. Because the second state change corresponds to a return to the idle state, the USB Extender resets itself and is now ready for the next event.

Figure 4:
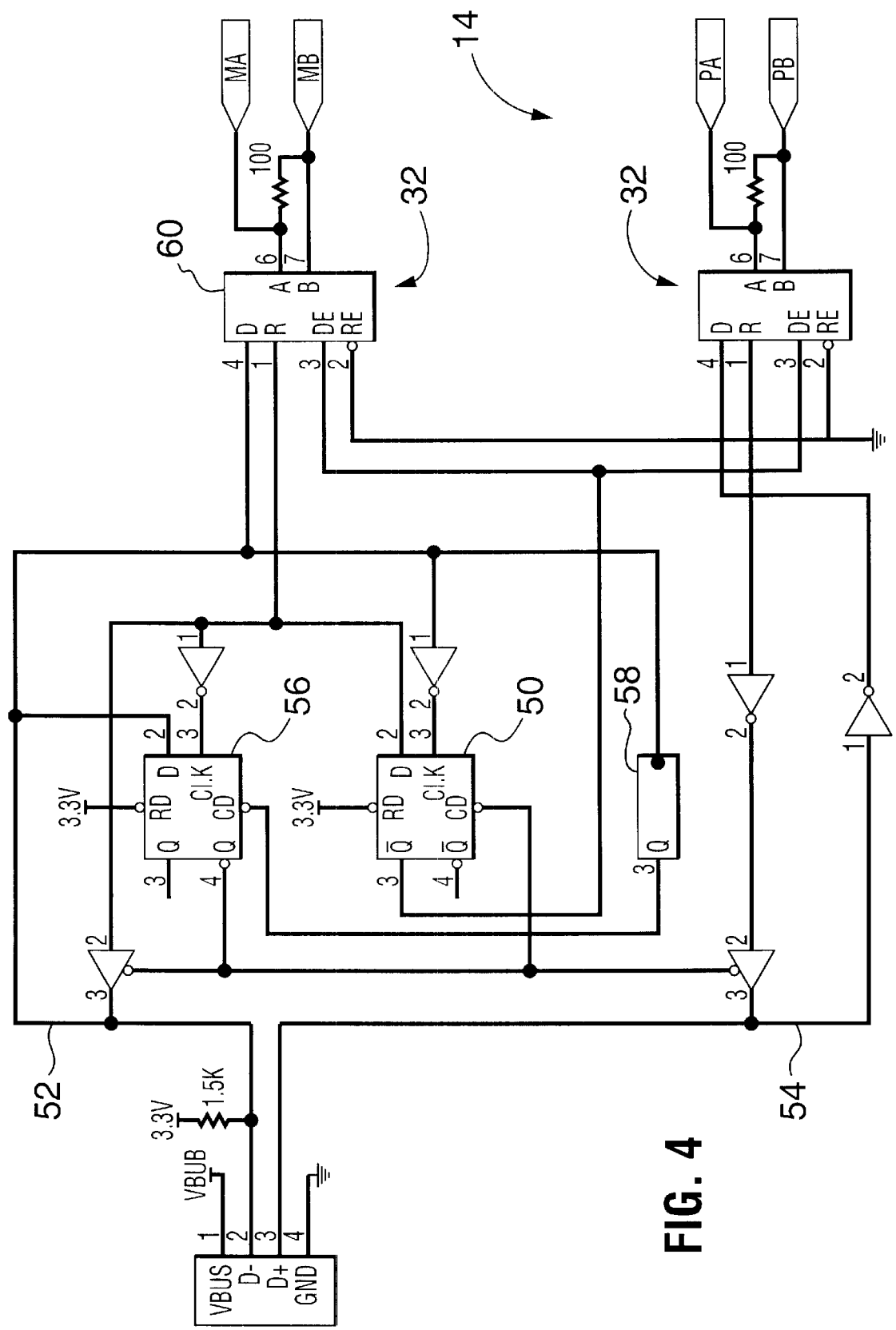
FIG. 4 is a more detailed circuit diagram of the extender device.

FIG. 4 shows a more detailed circuit diagram of the portion of extender attached to the upstream device (typically the computer). The circuitry that is attached to the downstream device (typically the keyboard or mouse) is similar. FIG. 4 shows only the low-speed portion of the circuit, as the, full-speed portion is essentially a duplicate.

This device 60, forming part of the converter 32, has a Driver input (D) and a Receiver output (R). Each of the D and R connections is gated by a corresponding Driver Enable (DE) or Receiver Enable input (RE). The Receivers are always enabled. The Driver Enable input (DE) is controlled by a latch 50. The upper transceiver carries D– related information, (MA and MB), while the lower transceiver carries D+ related information, (PA and PB).

Connections to the USB ports are direct. Both the D– and D+ signals from the USB port are connected to the driver inputs 52, 54 on the corresponding transmission line transceivers 30. The Receive connections from the transceivers are also to connected to the D– and D+ lines of the USB port; however these connections are made via a tri-state buffer. The output of the tri-state buffer is controlled by a second latch 56.

The output, (Q), of the latches 50, 56 is normally at logic 0, which means that neither the interface drivers nor the tri-state buffers are active. In the idle state, the circuit receives inputs from both the USB connection and from the transmission line 14.

The idle signal state of the USB connection to the downstream device is known a priori for the class of device, (low-speed or fall-speed). A low-speed device, (which matches the circuit diagram), will have an idle state of (1,0) for the (D–, D+) connections. The USB terminating resistors on the USB Extender unit attaching to the upstream device will be manually configured to emulate the corresponding device connected on the downstream USB Extender unit. The idle signal state of this USB connection, therefore, is also known a priori, and in this example is also (1,0) for (D–, D+).

The idle state of the transceiver is logic 1, so the two R signals from the transceivers will have a (1, 1) idle state. Note that inverters are used when linking the D+signal to the transceiver so that the (1,0) idle state of the USB properly corresponds to the (1, 1) idle state of the RS-485 transmission lines.

For a low-speed device, when a change from the idle state is initiated either on the USB side or on the transmission side, this will correspond to a change from logic 1 to logic 0 on the D− line. This means two things. First, for originator detection purposes, only negative edges must be detected for low speed devices, and second, only the D− line must be monitored, as changes on the D+ line provide no additional information.

The latches are connected such that a change from logic 1 to logic 0 at the USB or line side will result in a logic 0 to logic 1 change at the clock input of the corresponding latch 50, 56. The latches trigger on a rising edge and therefore detect all changes from the idle state on each side of the USB Extender. The clock input characteristics of the latches enable edge detection.

A negative going signal transition originating from the USB device side generates a clock to the latch 50. A negative going signal transition originating from the transmission line side will clock the upper latch.

The operation of the originator determination and direction control logic 42 will now be described in more detail. When a negative edge occurs for the first time, the appropriate latch (upper for transmission line or lower for USB), will get clocked and will change state. This state change automatically enables one set of transmitters: If the negative edge was received on the USB side, then the Driver Enable inputs on the transceivers are enabled, or if the negative edge was received on the transmission line side, the tri-state buffers connecting to the USB interface are enabled.

The latch that is clocked first determines the originator of the message. The USB Extender, by enabling one set of transmitters, can now pass information through from the message originating side to the other side.

Because the USB and transmission line connections run half-duplex communications on the same wires, a negative edge on one side of the USB extender will be transmitted to the other side, and will therefore result in a negative edge on the other side of the USB extender. The second function of the USB Extender logic circuitry is to ensure that signal transitions caused by pass through message information are not perceived as origination of a new message.

This discrimination is realized by cross-connecting the USB D− signal to input of the transmission line message latch (upper) and the transmission line D− Receive signal to the input of the USB line message latch (lower).

With the first negative edge, the corresponding latch 50, 56 will have a logic 1 input because this signal is driven by the opposite line which has not yet experienced a pass-through state change.

When the state change is passed through from one side to the other, the second latch will be triggered by the negative edge, but it will have a logic 0 input because its input signal is driven by the opposite line which has already experienced the state change. The second latch will detect the edge, however it will not change state.

A pulse generator circuit 58, (shown with a built-in 400 ns delay), automatically resets both latches 50, 56 to the idle state and disables all transmissions 400 ns after a return to the idle state on the D− line.

It will be noted that in accordance with the principles of the invention, there is no tracking of USB message packets. The USB Extender logic simply monitors for state changes from the idle condition and does not differentiate between the bus idle state (pull up resistors define line voltage) and the differential logic zero state (transceivers define line voltage). Each state change from the idle state is treated as a new event.

We claim:

1. An arrangement for extending the range of a peripheral bus carrying message packets on first and second signal lines, comprising:
    a first extender device for connection to a first peripheral bus port, said first extender device serving as repeater for transferring signals to and from said first peripheral bus port;
    a second extender device for connection to a second peripheral bus port said second extender device serving as repeater for transferring signals to and from said second peripheral bus port;
    first and second bi-directional balanced transmission lines interconnecting said first and second extender devices, said first and second bi-directional balanced transmission lines carrying signals from said respective first and second signal lines; and
    each said extender device comprising:
        a first pair of transceivers for connection to respective said first and second signal lines of a said peripheral bus port;
        a second pair of transceivers connected on one side thereof to said transceivers of said first pair and on another side thereof to said respective bi-directional transmission lines through respective unbalanaced-to-balanced converters; and
        control logic circuitry responsive to signal transitions on said first and second signal lines and on said transmission lines to control said transceivers to determine the direction of signal flow through said balanced transmission lines such that signals are directly transferred between said first and second peripheral bus ports over said transmission lines without tracking the message packets.

2. An arrangement as claimed in claim 1, wherein said control logic circuitry comprises detectors for detecting signal transitions in incoming signals.

3. An arrangement as claimed in claim 2, wherein edge detectors detect the rising and trailing edges of received signals.

4. An arrangement as claimed in claim 1, wherein said control logic circuitry comprises a pair of latches controlling a driver enable input of said balanced-to-unbalanced converters.

5. An arrangement as claimed in claim 1, wherein each said balanced transmission line is a twisted pair.

6. An arrangement as claimed in claim 1, wherein said peripheral bus is a USB bus.

7. An extender device for connection to a peripheral bus carrying message packets on first and second signal lines, comprising:
    a first pair of transceivers for connection to said respective first and second signal lines and forwarding signals received thereon;
    a second pair of transceivers connected on one side thereof to said transceivers of said first pair and on another side thereof to respective unbalanced-to-balanced converters for connection to respective bi-directional balanced transmission lines; and
    control logic circuitry responsive to signal transitions on said signal lines and said balanced transmission lines to control said transceivers to determine the direction of signal flow through said balanced transmission lines such that signals are directly transferred through said extender device without tracking the message packets.

8. An extender device as claimed in claim 7, wherein control circuitry includes detectors for detecting edges in incoming signals.

9. An extender device as claimed in claim 8, wherein said detectors detect rising and trailing edges in said incoming signals.

10. A method of extending the range of a peripheral bus having a first and second signal lines carrying message packets, comprising the steps of:
   detecting the presence of incoming signals on said first and signal lines;
   receiving said incoming signals on said first and signal lines;
   transmitting said received incoming signals on said first and second signal lines over respective bi-directional balanced transmission lines to respective far end transceivers without tracking said message packets;
   detecting the presence of incoming signals on said respective balanced transmission lines; and
   transmitting said received incoming signals on said respective balanced transmission lines to respective said respective first and second signal lines without tracking said message packets.

11. A method as claimed in claim 10, wherein transitions in the incoming signals are detected and used to control the direction of transmission.

12. A method as claimed in claim 11, wherein the transitions are edge detections.

* * * * *